United States Patent [19]

McCauley et al.

[11] 4,365,432
[45] Dec. 28, 1982

[54] FOLDABLE VIEWER

[76] Inventors: John W. McCauley, 23351 Burbank Blvd., Woodland Hills, Calif. 91367; Stephen Paul, 6525 Cleon Ave., North Hollywood, Calif. 91607

[21] Appl. No.: 293,250

[22] Filed: Aug. 17, 1981

[51] Int. Cl.³ .................. G02B 27/04; G09F 1/08; A63H 33/00
[52] U.S. Cl. ........................................ 40/365; 40/539; 46/1 L; 46/37
[58] Field of Search .............. 40/365, 124.1, 539; 46/1 L, 35, 36, 37

[56] References Cited

U.S. PATENT DOCUMENTS

| 1,682,594 | 8/1928 | Benjamin | 40/539 |
| 3,730,818 | 5/1973 | Salinari | 46/1 L |
| 3,962,816 | 6/1976 | Sarid | 46/1 L |

OTHER PUBLICATIONS

"Diagonal Folding", pp. 24 and 25 of *Paper Folding for Beginners*, 6/65, by W. Murray and F. Rigney (publ. by Dover).

Primary Examiner—Gene Mancene
Assistant Examiner—Michael J. Foycik, Jr.
Attorney, Agent, or Firm—Roger A. Marrs

[57] ABSTRACT

A foldable viewer is disclosed herein for presenting a graphic scene, message or the like which includes a square blank sheet of pliable material having a viewing area defined on a selected one of its surface for carrying suitable graphic or display subject matter intended to be viewed by the user. In one form, the viewing area is defined by a pair of outlined bands arranged normal to each other having opposite ends of the bands terminating at the respective adjacent edges of the square blank sheet material. Construction of the viewer is accomplished by folding selected and predetermined portions of the blank sheet over upon itself to construct an enclosure with an opening at one end for viewing the interior thereof and for particularly viewing the graphic or message material carried on the interior viewing areas.

1 Claim, 8 Drawing Figures

U.S. Patent   Dec. 28, 1982   4,365,432
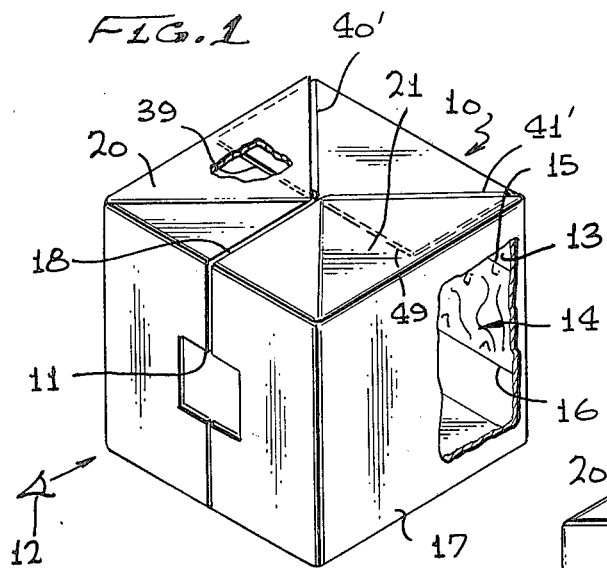
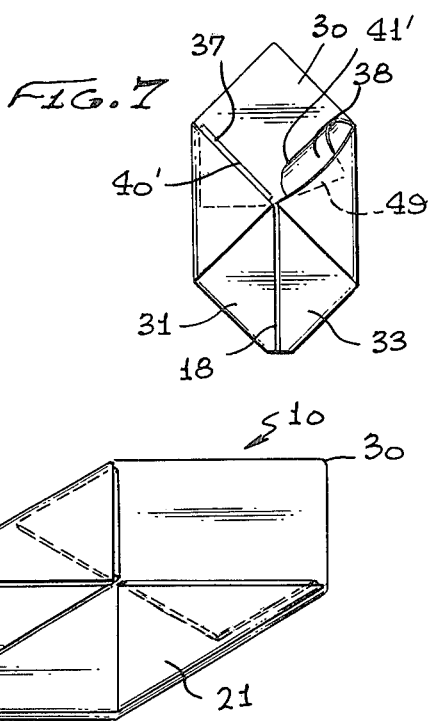
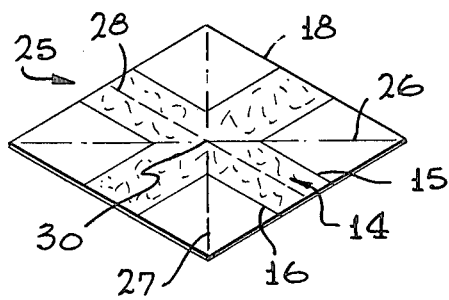
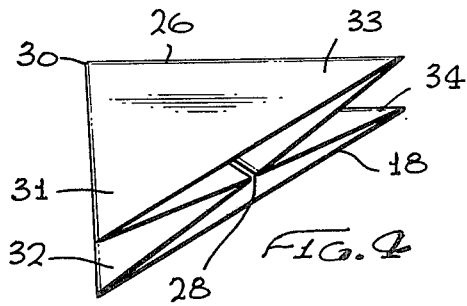
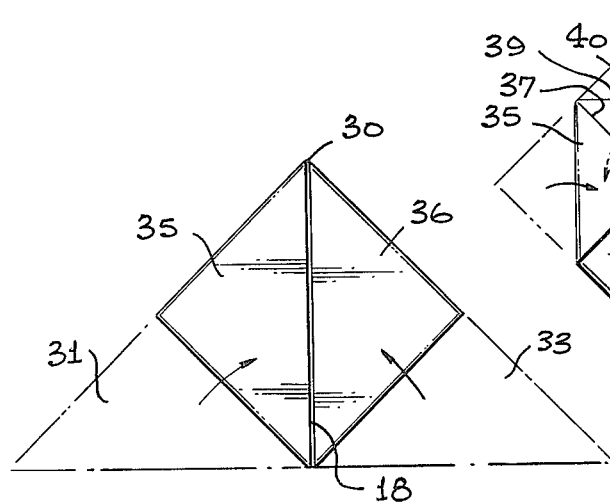
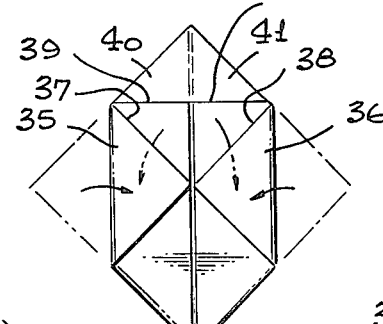
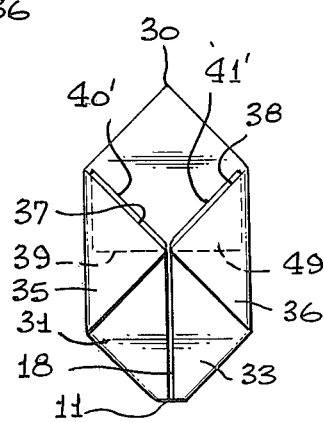

FOLDABLE VIEWER

BACKGROUND OF THE INVENTION

1. Field of the Invention

The present invention relates to foldable display or viewing devices and more particularly, to a novel foldable viewer which has an initial condition which is relatively flat and compact and which may be manipulated by the user to a second condition which provides an enclosure with a viewing aperture for viewing graphic or message material displayed on the interior walls of the enclosure.

2. Brief Description of the Prior Art

In the past, it has been the conventional practice to provide graphic displays or messages on blanks of relatively rigid material sheets which are commonly known as "greeting cards ". In general, such cards are folded over book-fashion along a single hinge line so that pages are presented for displaying the desired subject matter. In some instances, the inner pages of the greeting card are provided with additional display material taking the form of pop-out characters which automatically unfold as the card is opened and laid flat.

Although these prior greeting cards have been successful in presenting graphic materials and messages which are of interest and desired by the general public, the graphic material and messages are of no particular secret to the viewer since once the pages have been opened, the subject matter is on display for all to see. Also, it is believed that the presentation of pop-out characters is greatly limited since the fold lines are substantially parallel to the fold lines of the greeting card itself so that the characters will assume their intended proportion and shape as the card is opened. Again, in this latter instance, the graphic material is displayed to all in the immediate vicinity and their is a lack of mystery or intimacy which a totally enclosed greeting card would present.

Therefore, a long standing need has existed to provide a novel foldable viewer which may be readily employed as a greeting card so that its display graphics are concealed from surrounding viewers and which is available for viewing to only the person employing the device or viewer. Also, it is important that the device be foldable so that it may be sold or carried about in a folded condition and which may then be manipulated by the user into a second condition for viewing the subject matter.

SUMMARY OF THE INVENTION

Accordingly, the above problems and difficulties are obviated by the present invention which provides a novel foldable viewer for presenting graphic materials such as pictorial scenes, messages or the like which includes a square blank sheet of pliable material having a viewing area incorporated thereon for carrying desired graphic or display subject matter intended to be viewed by the user. Preferably, the viewing area is defined by at least one outlined band arranged on a selected one of the blank surfaces. Fold lines are selectively provided on the blank sheet so that selective folding of predetermined portions of the blank sheet upon itself provides an enclosure with an opening at one end for viewing the interior thereof and for particularly viewing the graphic or message material carried on the interior viewing areas.

Therefore, it is among the primary objects of the present invention to provide a novel foldable viewer which may be readily manipulated by the user between a folded substantially flat condition into an unfolded enclosure having a viewing aperture so that graphic material may be viewed therethrough on the interior walls of the enclosure.

Another object of the present invention is to provide a novel foldable viewer which may be readily employed as a greeting card having viewing subject matter which is concealed from viewers other than the person using the device.

Still another object of the present invention is to provide a foldable viewer having a novel presentation of graphic subject matter, pictorial scenes, messages or the like that may be carried in a relatively flat condition and yet unfolded to a second condition wherein the viewed subject matter is completely enclosed by the device.

Yet a further object of the present invention is to provide a novel greeting card which may be unfolded from a relatively flat condition to a three dimensional construction which displays suitable graphic or pictorial or message information on the interior walls thereof.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view of the novel foldable viewer incorporating the present invention and having a portion of its sidewall broken away to display a viewing area;

FIG. 2 is a perspective view of the novel foldable viewer shown in FIG. 1 and illustrating the viewer in a condition which is relatively flat preparatory for unfolding to the three dimensional condition shown in FIG. 1;

FIG. 3 is a perspective view of a square blank sheet of material illustrating display areas preparatory to constructing the viewer shown in FIGS. 1 and 2;

FIGS. 4, 5, and 6 illustrate a sequence of folding the blank shown in FIG. 3 in order to provide the viewer shown in FIGS. 1 and 2; and FIG. 7 is a fragmentary view of the viewer showing a trimmed corner in the process of being tucked into a pocket;

FIG. 8 is a top plan view of the folded viewer achieved by following the procedures shown in FIGS. 4, 5 and 6.

DESCRIPTION OF PREFERRED EMBODIMENT

The novel foldable viewer is illustrated in the general direction of arrow 10 in FIG. 1 and is illustrated in its three dimensional condition as the device would be used or viewed by the user. The viewer 10 is an enclosure having an interior defined by the opposing sidewalls of the enclosure and provided with a viewing aperture 11 for exposing the interior to the eye of the user which is identified by numeral 12. The back sidewall of the enclosure 10 is indicated by numeral 13 and it can be seen that a display area is carried thereon which is identified by numeral 14. The display area takes the form of a band outlined by markings 15 and 16 between which graphic material, pictorial data, messages or the like may be imprinted or carried thereon. The adjacent sidewall 17 is broken away to illustrate the viewing area and it is this viewing area which is available for display to the user's eye 12 via the aperture 11. Respective edges of the blank when opened at its initial stage of construction, is represented by numeral 18 and it is to be understood that the edge is continuous about the periphery of the blank. When the device is in the three dimensional condition as shown in FIG. 1, the edges are brought together along part of the top, along the front and around a portion of the bottom walls of the device. Both the top and bottom of the device include triangular flaps such as identified by numerals 20 and 21 appearing on the top of the device. It is to be understood that similar construction appears on the bottom of the device. The flaps 20 and 21 on the top as well as on the bottom are employed for holding or securing tucks which are taken during the folding procedure for constructing the enclosure. This precedure will be described later.

Referring now in detail to FIG. 2, the viewing device 10 is illustrated in its folded condition so that it is flat and in this condition, it may be stored, placed on a rack for sale, carried by the user in a convenient manner or the like. The device as shown in FIG. 2 may be expanded to the three dimensional condition shown in FIG. 1 by blowing air in the direction of arrow 23 into the aperture 11 so that the air pressure will expand the sidewalls. Once so expanded, the device is in its unfolded condition and use as a viewer may now be achieved.

Referring now in detail to FIG. 3, a blank of pliable sheet material is illustrated in the direction of arrow 25 which is in the form of a square having the peripheral continuous edge 18 defining the limits of the pliable blank or sheet. The display area 14 is outlined and for purposes of illustration, the display area takes the form of a pair of bands which are arranged normal to each other across the center of the square blank 25. The display or viewing area 14 may carry any suitable pictorial, graphic or printed subject matter which is intended to be viewed by the user. In order to form the viewer, the blank 25 is initially folded so as to provide a hinge line crease between opposite corners. One hinge line is represented by numeral 26 while the other hinge line is represented by numeral 27. If preferred, the hinge lines 26 and 27, or any other fold lines mentioned herein, may be scored into the blank so as to make it easier to fold. Next, the blank sheet 25 is folded horizontally in opposite directions, from the reverse side so as to define the hinge line or crease 28 across a center 30. Next, the blank sheet is folded on the diagonal hinge lines 26 and 27 and then pressed in on the horizonal reverse fold and followed by pressing together to form a pyramidial accordion-like shape as shown in FIG. 4. Next, the four corner portions 31–34 are folded to meet the tip 30 along the broken line showing. This procedure is repeated for all corner portions. These latter folding steps are shown more clearly in FIG. 5 as indicated by the respective arrows.

The blank is shown in solid lines in FIG. 5 as it appears after folding the four corners 31–34. Next, triangular portions 35 and 36 are folded over the broken line folds as indicated in FIG. 6. This step is carried through on both sides of the construction. Flaps 40 and 41 are torn or cut away to provide edges 39 and 49 which are then folded and tucked into pockets 37 and 38 respectively. All four corners follow this procedure so that the resultant folds are shown in solid lines in FIG. 6. In both FIGS. 5 and 6, the preparatory steps are shown in broken lines and the fold afterwards is shown in solid lines. The aperture 11 may be made by cutting or snipping the lower corner terminating with the edges 18. Proper tucks are made in trimming the flaps 40' and 41' into the pockets 37 and 38 so that the resultant folded viewer is illustrated as in FIG. 8.

In order to use the device as shown in FIG. 2, the viewer will place his lips over the aperture 21 and slightly blow so that the air pressure will expand the construction into the three dimensional condition shown in FIG. 1. At this time, the device is ready for the viewer to use and the display material contained on the areas 14 are available for view through the viewing aperture 11.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a foldable viewer for enclosing a graphic, pictorial or message display comprising the combination of:
  a blank sheet folded over upon itself to provide an enclosure having a continuous sidewall, a top and a bottom;
  a predetermined surface area carried on said blank constituting an interior wall surface;
  display data carried on said surface area;
  a viewing aperture provided in said continuous wall in a location opposite to said surface area so that said display data is visible therethrough;
  said enclosure includes a first condition which is characterized as being folded and flat and a second condition which is characterized as being unfolded and expanded into its operative position;
  said viewing aperture employed for conducting pressurized air therethrough for inflatably expanding said enclosure from its first condition into said second condition;
  said blank is provided with a plurality of creases constituting hinge or fold lines about which selected portions of said blank are folded to form said enclosure;
  certain ones of said selected portions of said blank provide pockets for insertably receiving other certain ones of said selected portions so as to bind or hold said enclosure together into a unitary construction;
  said blank is a square initially folded diagonally between opposite corners to establish an apex or center;
  said display data appearing across said apex;
  said apex appearing directly opposite said viewing aperture when said enclosure is in its expanded or second condition; and
  said creases are scored along the surface of said blank.

* * * * *